(12) United States Patent (10) Patent No.: US 6,396,946 B1
Sogawa (45) Date of Patent: May 28, 2002

(54) STEREOSCOPIC IMAGE PROCESSING APPARATUS

(75) Inventor: Yoshiyuki Sogawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/238,227

(22) Filed: Jan. 27, 1999

(30) Foreign Application Priority Data

Jan. 29, 1998 (JP) .......................................... 10-017428

(51) Int. Cl.⁷ ................................................ G06K 9/00
(52) U.S. Cl. ..................................................... 382/154
(58) Field of Search ................................ 382/154, 151, 382/153; 348/116, 118, 119, 122, 129, 113, 143

(56) References Cited

U.S. PATENT DOCUMENTS 5,410,346 A * 4/1995 Saneyoshi et al. .......... 348/116
5,808,591 A * 9/1998 Mantani ....................... 345/82
5,973,656 A * 10/1999 Yokoi et al. .................. 345/82
6,191,808 B1 * 2/2001 Katayama et al. ............ 348/39

* cited by examiner

Primary Examiner—Andrew W. Johns
Assistant Examiner—Seyed Azarian
(74) Attorney, Agent, or Firm—Martin A. Farber

(57) ABSTRACT

A stereoscopic image detecting unit has a first non-volatile memory for storing inherent camera characteristic data therein and an image processing unit has a second non-volatile memory for storing inherent circuit characteristic data therein. When the stereoscopic image detecting unit is connected with the image processing unit through a serial cable and video cables and then electric power is turned on, the inherent camera characteristic data are sent to the image processing unit. In the image processing unit, based on the camera data sent from the image detecting unit and the circuit characteristic data in the image processing unit, data for correcting the optical dispersion between two cameras and that of signal characteristic are established.

12 Claims, 1 Drawing Sheet

STEREOSCOPIC IMAGE PROCESSING APPARATUS

BACKGROUND OF THE INVENTION

1. Field of the Invention

The present invention relates to a stereoscopic image processing apparatus for a vehicular distance detecting system and more particularly to a stereoscopic image processing apparatus capable of arbitrarily combining for use an image detecting unit and an image processing unit.

2. Prior Arts

Modern advanced safety vehicles are equipped with a distance detecting means for detecting a distance between the self vehicle and other vehicles, obstacles and surrounding objects. Such a distance detecting means comprises an image detecting unit for taking picture images of solid objects, lane markers and the like and for outputting image signals and an image processing unit for processing those image signals into distance information.

A typical example of the image detecting unit employs optical systems, i.e., a pair of left and right hands cameras disposed in a horizontally aligned relation at a prescribed distance apart from each other.

The image processing unit successively shifts the image signals from the image detecting unit and electrically superimposes them one over the other to find a best match of two images from the left and right hands cameras, so that the distance from those cameras to an object is calculated based on the principle of triangulation.

Therefore, it is desirable that there is no difference except parallax between two image detecting systems in optical and electrical characteristics. That is to say, optical axes of two cameras must be in parallel with each other and focal lengths must be identical. Further, the difference in aberration characteristic of lenses and the deviation amount at the infinite-point also must be identical. Further, the sensitivity of image elements and the characteristic of signal processing circuits of respective cameras must be identical.

Similarly, on the image processing unit side, the amplitude characteristics such as gain, offset and the like of respective amplifiers must be identical.

The dispersion of the optical characteristics and that of the signal characteristics in both image detecting systems can be adjusted to some extent on the image detecting unit side and on the image processing unit side respectively, however the adjustment is still inadequate. Therefore, in addition to this adjustment, a look-up table correction in which the correction is made based on a table of the sensitivity of image elements, a shading correction in which the sensitivity is corrected per zone of picture images and the like, are used. That is, in the conventional manufacturing process, the image detecting unit is adjusted integrally with the image processing unit to equalize characteristics.

Hence, it is impossible to combine the image detecting unit and the image processing unit each of which is manufactured independently and this inhibits an improvement in productivity. Furthermore, on repairing in markets, when one of these units must be repaired, the other also must be adjusted. In some case, the look-up table of the image processing unit must be reestablished.

SUMMARY OF THE INVENTION

The present invention is intended to obviate the aforementioned problems of the known stereoscopic image processing apparatus. An object of the present invention is to provide an improved stereoscopic image processing apparatus whose image detecting unit can be arbitrarily combined for use with the image processing unit.

To attain the object, according to the present invention, the stereoscopic image processing apparatus comprises a first non-volatile memory provided in an image detecting unit for memorizing a camera characteristic data for correcting dispersions of characteristics between a pair of cameras, a means provided in the image detecting unit for reading out the camera characteristic data from the non-volatile memory and for transmitting the data to the image processing unit, a second non-volatile memory provided in an image processing unit for memorizing a circuit characteristic data for correcting dispersions of characteristics between two circuits of the cameras and a means provided in the image processing unit for correcting image signals outputted from the pair of cameras based on the circuit characteristic data read out from the second non-volatile memory and the camera characteristic data sent from the image detecting unit.

DETAILED DESCRIPTION OF A PREFERRED EMBODIMENT

Figure 1:
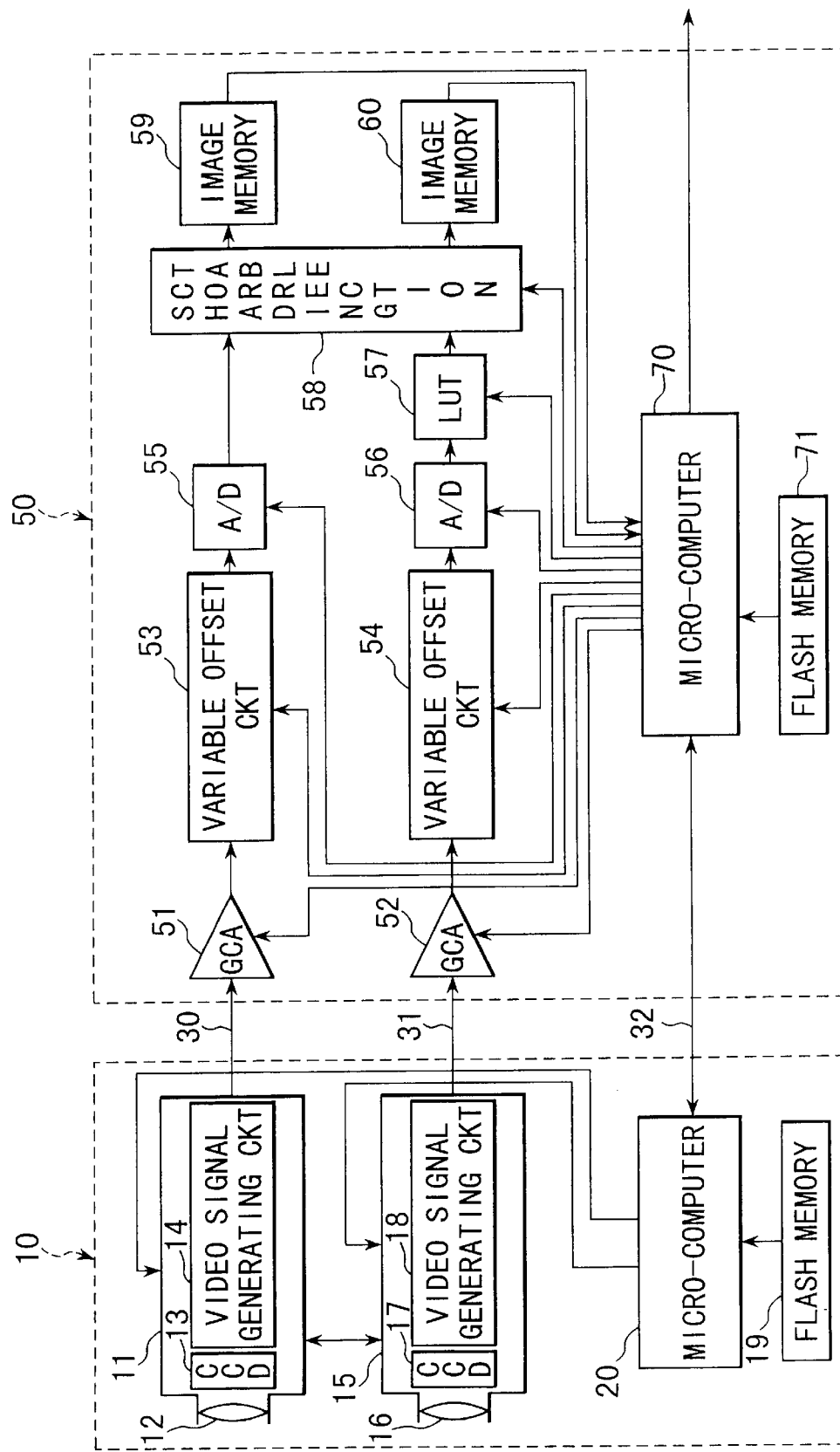
FIG. 1 is a schematic block diagram of a stereoscopic image processing apparatus according to the present invention.

An embodiment of the present invention will now be described in detail with reference to the accompanying drawing.

FIG. 1 shows the schematic construction of a stereoscopic image processing apparatus, which comprise a stereoscopic image detecting unit 10 including two CCD (Charge Coupled Device) cameras 11, 15 and a stereoscopic image processing unit 50. This stereoscopic image processing apparatus is mounted on a vehicle so as to obtain distance information from the vehicle to an object by processing a pair of picture images taken by two CCD cameras 11, 15 and to recognize the configuration of roads or solid objects based on distance information obtained.

The two CCD cameras 11, 15 are mounted in the vehicle in a horizontally aligned relation at a prescribed distance away from each other. These two cameras have a variable shutter speed mechanism and are operated synchronously with each other. The optical axes of lenses 12, 16 are arranged in parallel with each other. One CCD camera 11 comprises a CCD 13 which is an image sensor for transforming images formed by the lens 12 into electric signals and a video signal generating circuit 14. The video signal generating circuit 14 is composed of an amplifier for amplifying the signals from the CCD 13, a synchronous signal synthesizing device for outputting compound picture signals (video signals) which are synthesized by picture signals from the amplifier and synchronizing signals, and a timing signal generating device for generating timing signals to control the CCD 13 and the amplifier. The other CCD camera 15 has a similar construction comprising a lens 16, a CCD 17 and a video signal generating circuit 18.

The stereoscopic image detecting unit 10 incorporates a flash memory 19 defined as a first non-volatile memory and a micro-computer 20 therein. The flash memory 19 is a memory for storing correction data to correct the dispersions of the characteristics of the cameras 11, 15. Further, the micro-computer 20 is for controlling shutter speeds of the CCD cameras and for reading out the correction data from the flash memory 19 to send them to the image processing unit 50.

The correction data stored in the flash memory 19 include data for correcting the optical deviation between two CCD cameras 11, 15 by means of image transformation (affine transformation and the like), data for correcting an actual angle of view in order to diminish the effect of the focal length and aberration of the lenses, data for correcting the effect of the deviation of the infinite point between two pictures, data for correcting the difference of respective output characteristics of the CCDs 13, 17 in the CCD cameras 11, 15, data for correcting dispersions of respective signals caused by the difference in the circuit characteristics such as gain of the amplifier and the like.

On the other hand, the image processing unit 50 has gain control amplifiers (GCA) 51, 52 which are variable gain video amplifier for amplifying analogue picture images from respective CCD cameras 11, 15, variable offset circuits 53, 54 for equalizing the offset amount of both image signals and A/D converters 55, 56 for transforming analogue images into digital images having prescribed brightness gradations.

Further, a look-up table (hereinafter, referred to as LUT) 57 is connected downstream on either of two circuits, in this embodiment, on the circuit of the CCD camera 15 side. The LUT 57 is for changing the sensitivity of the image signal from the A/D converter 56. An output of the LUT 57 of one system (on the camera 15 side)and that of the A/D converter 55 of the other system (on the camera 11 side) are inputted to a shading correction table 58 which is constituted by RAM. In this embodiment, the LUT is disposed only on one system (on the camera 15 side), but otherwise it may be disposed on both systems (on both cameras 11, 15 sides).

The image data of respective systems corrected by the shading correction table 58 are stored in image memories 59, 60 respectively and read out by a micro-computer 70. In the micro-computer 70, the respective image data are subjected to a stereo-matching, that is, the image on the reference side is successively compared with that on the compared side until finding the same pattern in two image data, and when the same pattern is found, the deviation amount (parallax) between two images is obtained. Based on this deviation amount, the distance to an object is calculated and expressed in numbers. This numeral information is assembled into three-dimensional image information and the configurations of roads, solid objects and others are recognized based on this three-dimensional image information.

The image processing unit 50 includes a flash memory 71 defined as a second non-volatile memory for storing circuit characteristic data to correct the dispersion of the circuit characteristic generated when manufacturing the unit. The circuit characteristic data include control data of the GCA 51, 52, control data of the variable offset circuit 53, 54, data to be sent to the LUT 57, data to be sent to the shading correction table 58 and the like.

Thus constituted image detecting unit 10 and image processing unit 50 are not restricted in the mutual combination. That is, the stereoscopic image processing apparatus can be operative with an arbitrary combination of the image detecting unit 10 and the image processing unit 50 only by connecting both units through video cables 30, 31 and a serial cable 32.

In the stereoscopic image processing apparatus obtained by arbitrarily combining the image detecting unit 10 and the image processing unit 50, when power is introduced, the micro-computer reads out the inherent characteristic data of cameras from the flash memory 19 and sends those data to the micro-computer 70 of the image processing unit 50.

In the micro-computer 70, the characteristic data of cameras is combined with the circuit characteristic data read from the flash memory 71 to establish the image transforming data for correcting the optical deviation between two cameras, the correction data for correcting focal lengths and aberrations and the correction data for correcting the deviation between the infinite points of two cameras. Further, in the micro-computer 70, the voltage data for determining gain in the GCA 51, the voltage data for determining gain in the GCA 52, the voltage data for determining offset in the variable offset circuit 53, the voltage data for determining offset in the variable offset circuit 54, the table data of the LUT 57 and the table data of the shading correction table 58 are established so as to be adapted to the inherent characteristic of the image detecting unit 10 actually connected. Among these data, the above voltage data are outputted to the GCAs 51, 52, the variable offset circuits 53, 54 through a D/A converter (not shown) and the table data are sent to the RAM constituting of the LUT 57 and the RAM constituting of the shading correction table 58 respectively to make an initial establishment.

When the initial establishment has finished, the system comes into an operative state. When the respective video signals from the CCD cameras 11, 15 are transmitted to the image processing unit 50 through the video cables 30, 31 respectively, the GCA 51, 52 adjust the gain of the image signal according to the respective control voltages and the variable offset circuits 53, 54 adjust the difference of offset between respective image signals according to the respective control voltages.

The respective image signals thus adjusted for respective CCD cameras 11, 15 are outputted to the A/D converters 55, 56, in which those analogue image signals are converted into the digital image signals having prescribed brightness gradations (for example, 256 gradations in gray scale) by the reference voltage outputted from the D/A converter in the micro-computer 70.

Further, the digital image data of one circuit is given to the LUT 57 of the next stage as address data and the gain and offset are adjusted more precisely therein. Further, the digital data of the other circuit from the A/D converter 55 are given to the shading correction table 58 as address data and the reduction of brightness due to the shading phenomenon generated in the optical systems of the CCD cameras 11, 15, are corrected and stored in the image memories 59, 60 respectively.

Further, in the micro-computer 70, with respect to the images stored in the image memories 50, 60, miscellaneous optical corrections such as a correction for errors generated at image transformations, a correction for angle of view, a correction for deviation of infinite points and other corrections are made and thus corrected images are subjected to stereo-matchings. The three-dimensional image information thus obtained is used for miscellaneous recognition processes at the next stage. These corrections and stereo-matchings may be performed in other circuits to be used only for these objects. Further, thus corrected images may be stored in respective memories 59, 60.

The advantage of this invention lies in the capability of manufacturing the stereoscopic image detecting unit 10 and the image processing unit 50 separately, this leading to a substantial improvement in productivity. Further, in markets, even when the stereoscopic image detecting unit 10 or the image processing unit 50 is replaced with the other corresponding one, the optical characteristic and signal characteristic can be automatically adjusted so as to be matched with each other, thereby repair works are greatly improved.

In this embodiment, the characteristic data of cameras are sent from the image detecting unit 10 to the image processing unit 50 when electric power is turned on and they are combined for use with the circuit characteristic data memorized in the image processing unit 50, however it is not always necessary to send the characteristic data of cameras each time electric power is turned on. For example, the image processing unit 50 may be provided with a flash memory for memorizing the camera characteristic data together with the circuit characteristic data, wherein the image detecting unit 10 memorizes a unit identification code. When at first electric power is turned on, the unit identification code is written on the flash memory together with those characteristic data. Next, when electric power is turned on, the data stored in the flash memory may be used as they are unless changed otherwise.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A stereoscopic image processing apparatus having an image detecting unit including a pair of cameras for imaging stereoscopic image pictures and an image processing unit for processing said image pictures, comprising:

a first non-volatile memory provided in said image detecting unit for memorizing a camera characteristic data for correcting dispersions of characteristics between said pair of cameras;

a first computer provided in said image detecting unit for reading out said characteristic data from said non-volatile memory and for transmitting said data to said image processing unit;

a second non-volatile memory provided in said image processing unit for memorizing a circuit characteristic data for correcting dispersions of characteristics between two systems of said cameras; and a second computer provided in said image processing unit for correcting image signals outputted from said pair of cameras based on said circuit characteristic data read out from said second non-volatile memory and said camera characteristic data sent from said image detecting unit.

2. The apparatus according to claim 1, wherein said camera characteristic data includes a data for correcting a dispersion of an output characteristic of an image sensor of said respective cameras.

3. The apparatus according to claim 1, wherein said camera characteristic data includes a data for correcting a dispersion of a circuit characteristic in a video signal generating circuit.

4. The apparatus according to claim 1, wherein said circuit characteristic data includes a control data of a gain control amplifier for changing a gain of image signals.

5. The apparatus according to claim 1, wherein said circuit characteristic data includes a control data of a variable offset circuit for varying an offset of image signals.

6. The apparatus according to claim 1, wherein said circuit characteristic data includes a data of a look-up table for changing a gain of image signals.

7. The apparatus according to claim 1, wherein said circuit characteristic data includes a data of a shading correction table for correcting a dispersion of sensitivity per zone in said image pictures.

8. The apparatus according to claim 1, wherein said camera characteristic data includes an image transforming data for correcting a deviation of the optical position of said pair of cameras.

9. The apparatus according to claim 1, wherein said camera characteristic data includes an angle of view correction data for correcting a deviation of focal length between lenses and the effect of aberration of lenses.

10. The apparatus according to claim 1, wherein said camera characteristic data includes a data for correcting a deviation between infinite points of images taken by said pair of cameras.

11. The apparatus according to claim 1, wherein said image detecting unit is independent from said image processing unit.

12. A stereoscopic image processing apparatus having an image detecting unit including a pair of cameras for imaging stereoscopic image pictures and an image processing unit for processing said image pictures, comprising:

a first non-volatile memory provided in said image detecting unit for memorizing a camera characteristic data for correcting dispersions of characteristics between said pair of cameras;

a means provided in said image detecting unit for reading out said characteristic data from said non-volatile memory and for transmitting said data to said image processing unit;

a second non-volatile memory provided in said image processing unit for memorizing a circuit characteristic data for correcting dispersions of characteristics between two systems of said cameras; and a means provided in said image processing unit for correcting image signals outputted from said pair of cameras based on said circuit characteristic data read out from said second non-volatile memory and said camera characteristic data sent from said image detecting unit.

\* \* \* \* \*